US006404537B1

(12) United States Patent
Melman et al.

(10) Patent No.: US 6,404,537 B1
(45) Date of Patent: Jun. 11, 2002

(54) POLARIZATION TRANSFORMER

(75) Inventors: Paul Melman, Newton; Yingyin Zou, Burlington; Qiushui Chen, Medford, all of MA (US)

(73) Assignee: Corning Applied Technologies Corporation, Woburn, MA (US)

( * ) Notice: Subject to any disclaimer, the term of this patent is extended or adjusted under 35 U.S.C. 154(b) by 0 days.

(21) Appl. No.: 09/519,293

(22) Filed: Mar. 6, 2000

(51) Int. Cl.$^7$ .............................. G05F 1/33; G05F 1/10; G05B 24/02; G02F 1/295
(52) U.S. Cl. ................... 359/323; 359/251; 359/245; 385/8
(58) Field of Search .................. 359/323, 251, 359/245, 254, 255, 252; 385/8

(56) References Cited

U.S. PATENT DOCUMENTS

| 3,663,088 A | 5/1972 | Maldonado et al. ........ 359/252 |
| 3,684,350 A | 8/1972 | Wentz ........................ 359/252 |
| 3,719,414 A | 3/1973 | Wentz ........................ 350/150 |

(List continued on next page.)

FOREIGN PATENT DOCUMENTS

| DE | 905532 | 3/1999 |
| EP | 0 054 411 | 6/1982 |
| EP | 0663604 A1 | 7/1995 |
| JP | 54-79060 | 6/1979 |
| JP | 62148923 | 7/1987 |
| JP | 63246720 | 10/1988 |
| JP | 08076071 | 3/1996 |
| WO | WO 99/67679 | 12/1999 |

OTHER PUBLICATIONS

Yariv, A. and Yeh, P., *Optical Waves in Crystals*, pp. 242–245 eds. John Wiley & Sons, Inc., New York, NY and Mei Ya Publications, Inc., Taipei, Taiwan, 1st Edition, Dec., 1983.

Sandel, D., et al., "10–Gb/s PMD Compensation Using Deformed–Helical Ferroelectric Liquid Crystals," 24thEuropean Conference On Optical Communication, Madrid, Spain, 20–24 Sep. 1998.

Shimizu, H., et al., "Endless Polarisation Controller Using Electro–Optic Waveplates," *Electronics Letters*, Mar. 21, 1988, 14 (7): 412–413.

Shimizu, H., et al., "Highly Practical Fiber Squeezer Polarization Controller," *Journal of Lightwave Technology, IEEE*, 9(10) : 1217–1223, Oct. 1991.

Rumbaugh, Scott H. et al., "Polarization Control for Coherent Fiber–Optic Systems Using Nematic Liquid Crystals", Journal of Lightwave Technology, Mar. 1990.

*Primary Examiner*—Georgia Epps
*Assistant Examiner*—Tim Thompson
(74) *Attorney, Agent, or Firm*—Hamilton, Brook, Smith & Reynolds, P.C.

(57) ABSTRACT

A polarization transformer includes at least one plate of transparent polycrystalline material which has an optical axis oriented perpendicular to a propagation direction of incident radiation having a first polarization state. The plate includes electrodes for applying an electric field across a plane of the plate perpendicular to the propagation direction so as to provide controlled phase change such that the polarization of radiation transmitted through the polarization transformer is transformed from the first polarization state to a second polarization state. The plate in a preferred embodiment comprises a ferroelectric complex oxide such as lead lanthanum zirconate titanate (PLZT) material. Such a material provides devices that have very fast response (on the order of microseconds) and low insertion loss.

22 Claims, 3 Drawing Sheets

U.S. PATENT DOCUMENTS

| | | | |
|---|---|---|---|
| 4,201,450 A | 5/1980 | Trapani | 359/252 |
| 4,384,760 A | 5/1983 | Alferness | 350/96.14 |
| 4,410,238 A | 10/1983 | Hanson | 350/347 E |
| 4,428,873 A | 1/1984 | Murayama et al. | 252/583 |
| 4,548,478 A | 10/1985 | Shirasaki | 359/256 |
| 4,572,619 A | 2/1986 | Reininger et al. | 359/254 |
| 4,636,786 A | 1/1987 | Haertling | 340/783 |
| 4,746,191 A | 5/1988 | Kawakami et al. | 395/16 |
| 4,958,918 A | 9/1990 | Walker | 350/378 |
| 4,966,431 A | 10/1990 | Heismann | 350/96.14 |
| 5,004,314 A | 4/1991 | Booth et al. | 350/96.14 |
| 5,005,952 A | 4/1991 | Clark et al. | 350/335 |
| 5,029,989 A | 7/1991 | Phillips | 359/276 |
| 5,090,824 A | 2/1992 | Nelson et al. | 385/22 |
| 5,212,743 A | 5/1993 | Heismann | 385/11 |
| 5,254,293 A | * 10/1993 | Flicstein et al. | 264/1.3 |
| 5,276,747 A | 1/1994 | Pan | 385/34 |
| 5,285,507 A | 2/1994 | Van der Tol et al. | 385/11 |
| 5,727,109 A | 3/1998 | Pan et al. | 385/140 |
| 6,137,619 A | * 10/2000 | Chen et al. | 359/251 |

\* cited by examiner

POLARIZATION TRANSFORMER

BACKGROUND OF THE INVENTION

Transformation of the state of polarization (SoP) of light beams is important in many applications. For example, fiber optic communication systems often include optical devices that are sensitive to the direction at which light is polarized. Yet typical optical fibers do not preserve the state of polarization. Further, the different polarization directions can have different propagation velocities (birefringence) and thus can contribute to the degradation of optical communication signals. To counter this deleterious effect known as polarization mode dispersion, a polarization transformer can be used to actively adjust the polarization state of the incoming light signal so that a corrective different delay can be applied and thereby correct for the velocity mismatch.

Much progress has been made in the development of polarization transformers, but current devices are not very satisfactory for many applications. In many applications, it is desirable that such devices have fast response time and low insertion loss. The current devices include integrated optical waveguides, liquid crystal-based devices and optical fiber-based devices.

The integrated optical waveguides are typically made of lithium niobate and can include an input phase shifter section, a polarization converter section and an output phase shifter section. These waveguides have very fast response times; however, such devices have high insertion loss and are expensive to produce.

The liquid crystal-based devices include nematic liquid crystal cells whose birefringence is controlled using an external voltage. The liquid crystal devices are slower than the lithium niobate waveguides and are difficult to control in intermediate states. Although it has the desirable features of low insertion loss and low required operating voltage, the long term reliability of organic materials and the relatively low switching speed of a liquid crystal-based device are not suitable for many applications.

The optical fiber based devices use a fiber loop arrangement which operates according to the principle that changing the relative plane of the fiber loops changes the polarization state at the output. The fiber loop devices have very low insertion loss but are the slowest of the three current device types.

SUMMARY OF THE INVENTION

There is a need for an approach to fabrication of polarization transformers which provides devices that have very fast response time and low insertion loss.

Accordingly, an embodiment of a polarization transformer comprises at least one plate of transparent polycrystalline material which has an optical axis oriented perpendicular to a propagation direction of incident radiation having a first polarization state. The at least one plate includes electrodes for applying an electric field across a plane of the plate perpendicular to the propagation direction so as to provide controlled phase change such that the polarization of radiation transmitted through the polarization transformer is transformed from the first polarization state to a second polarization state. The plate in a preferred embodiment comprises a ferroelectric complex oxide such as lead lanthanum zirconate titanate (PLZT) material. Such a material provides devices that have very fast response (on the order of microseconds) and low insertion loss.

According to an aspect of the material, the plate is isotropic in the absence of an applied electric field across the plate electrodes. An electric field corresponding to an applied voltage less than 400 volts provides a phase retardation of about 180 degrees.

In accordance with another embodiment, the polarization transformer comprises first and second plates disposed such that the incident radiation is transmitted through the two plates and the orientation of an optical axis of the second plate is at an angle such as 45 degrees with respect to the optical axis of the first plate.

In accordance with yet another embodiment, the polarization transformer comprises first, second and third plates disposed such that the incident radiation is transmitted through the three plates and the orientation of an optical axis of the second plate is at 45 degrees with respect to the optical axis of the first and third plates.

According to an another aspect, the polarization transformer is capable of transforming a first arbitrary polarization state at its input to a second arbitrary polarization state at its output.

A preferred embodiment of the invention includes a polarization transformer in an optical communication system including an input optical fiber, an input optical coupling, a polarization transformer, an output optical coupling and an output optical fiber.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Polarization direction is a tern which refers to the angular orientation of a polarization plane with respect to some external reference plane and not to a direction of travel. Electrical phase shift can be expressed indegrees or radians. Degrees are used herein, but should not be confused with angular orientations.

Figure 1:
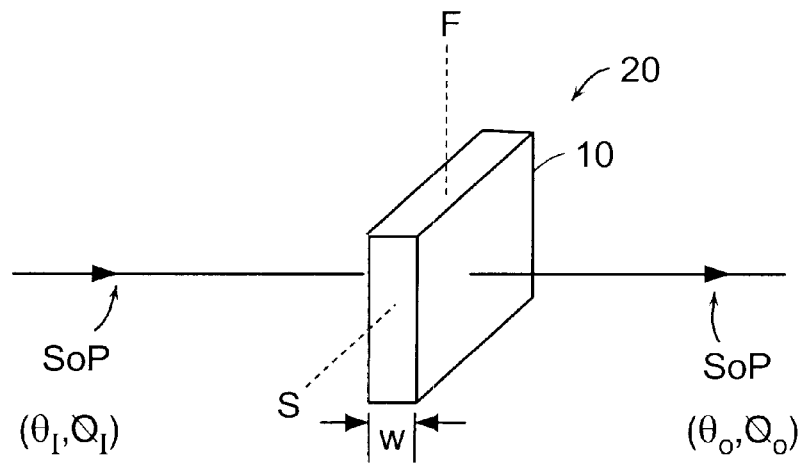
FIG. 1 is a schematic diagram illustrating an embodiment of a polarization transformer having a single plate.

An embodiment of a single plate polarization transformer 20 is shown in FIG. 1. A radiation beam travels from left to right in the figure and passes through a plate 10. In general, the polarization state of a radiation beam can be defined by two parameters, $\theta$ and $\phi$, where $\theta$ defines the relative magnitudes of orthogonal components and $\phi$ defines their relative phase. The operation of the single plate 10 is such that input radiation having a constant state of polarization SoP ($\theta_I$, $\phi_I$) is incident on the plate. The output radiation is shown having an output state of polarization SoP ($\theta_O$, $\phi_O$). With a voltage applied to electrodes of the plate (described further herein), those components that are polarized along the slow (S) and fast (F) axes, as described below, are retarded in optical phase by different amounts as they travel through the plate's thickness w. The effects may be visualized as rotating the polarization direction of the beam. When a half-wave voltage $V_\pi$ is applied, the component polarized along the fast axis becomes 180° out of phase with the component polarized along the slow axis so that its direction is reversed. Thus, the plate 10 operates to transform a constant input SoP to an output SoP that is tunable over a range of at least 180 degrees.

There are a number of materials and mechanisms that can be used to provide a polarization transformer which will be discussed in more detail below. Its operation in the embodiment illustrated in FIG. 1 can be explained by assuming an ideal material which, with no voltage applied, has equal indices of refraction for all polarization directions (i.e., isotropic). When a voltage is applied, the applied electric field induces a change in index of refraction (also known as field-induced birefringence) along two principal axes referred to as the fast and slow axes, respectively. The radiation components polarized along the fast and slow axes travel with refractive indices $n_F$ and $n_S$, respectively. The induced birefringence thus causes a relative phase shift in the components. If the plate has a thickness W, the accumulated phase shift or difference is given by $\Delta\phi=2\pi(n_F-n_S)W/\lambda$. By adjusting W, $\Delta\phi$ can be made to be $\pi$ radians=180°. This means that after traversing the plate, the electric field of one polarization component has the opposite sign relative to the other compared to when they entered the plate. For example, if the incoming polarization direction with respect to the optical axis is $\beta$, the outgoing direction is then 180°−$\beta$ for ($n_F-n_S$) positive.

The general requirement for the polarization transformer plate is that, when a voltage is applied, a phase shift is $\Delta\phi$ produced between differing polarization directions. Preferably, the material has a high electro-optic coefficient in order to reduce operating voltages to less than 500 volts. Preferably, the mechanical characteristics allow formation of a bar or plate. Further, the material must be transparent at the wavelength of interest, e.g., between 1200 nm and 1600 nm.

A number of electro-optic materials are available, but many require on the order of kilovolts to obtain an appreciable phase change. These requirements are satisfied by a class of ferroelectric complex oxides which 1) are optically isotropic; 2) have a Curie temperature less than about 300° C., so that electro-optic coefficients are high near room temperature; 3) have a diffusive phase transition, so that the temperature dependence of the electro-optic coefficients is lessened; and 4) which are not permanently poled by moderate electric fields since materials with a low Curie temperature that become permanently poled are less stable. Example material systems include lead zirconate titanate (PZT), lanthanum modified PZT (PLZT), lead manganese niobate (PMN), and a solid solution of lead manganese niobate and lead tantalate (PMN-PT). Besides PLZT and PZT, without being an exhaustive list the following materials may be used: $Pb(Zr,Ti)O_3$, $Pb(Mg,Nb)O_3$, and a solid solution of $Pb(Mg,Nb)O_3$ and $PbTaO_3$. More members of this class may be discovered in the future.

High speed electro-optic modulators using such materials are described in International Application No. PCT/US99/07761 filed Apr. 8, 1999 which is a continuation-in-part of U.S. application Ser. No. 09/158,224 filed Sep. 22, 1998, which claims priority to U.S. Provisional Application No. 60/081,011, filed Apr. 8, 1998, and in addition, claims priority to U.S. Provisional Application No. 60/117,386, filed Jan. 27, 1999, the entire contents of all the above applications being incorporated herein by reference.

In general, for any material with an optical path length, D, index of refraction, n, and an applied voltage producing an electric field, $\xi$, one can write:

$$\Delta L = n\Delta D + D\Delta n = nD[d\xi + \gamma\xi^2 - 0.5n^3(r\xi + R\xi^2)]$$

The four terms on the right represent the piezoelectric, electrostrictive, linear electro-optic (Pockell) and quadratic electro-optic (Kerr) effects with coefficients, d, $\gamma$, r, and R, respectively. All materials exhibit the effects which depend quadratically on $\xi$ to a greater or lesser extent. There also exist 20 classes of piezoelectric crystals with no center of symmetry that also exhibit the two effects which depend linearly on $\xi$. In many devices, the range of $\Delta\phi$ required is from 0 to $\pi$ radians. At $\pi$ radians, $\Delta L$ has change by half a wavelength. Materials are often characterized by the voltage required to effect such a half wavelength change, the half-wave voltage, $V_\pi$.

PLZT with a nominal 9/65/35 La/Pb/Zr composition is a preferred material. This composition is known to be transparent in a range from 450 nm to 7 $\mu$m; see, for example, Lionel M. Levinson, Electronic Ceramics, Chapter 7 (Marcel Dekker, New York, 1987). It is commercially available as hot pressed ceramic plates from Aura Ceramics (New Hope, Minn.). In the form of hot-pressed ceramics, it is optically isotropic and exhibits little birefringence with zero applied voltage. The electro-optic coefficient is high and the effect is approximately quadratic with voltage. PLZT does not exhibit large linear effects (d=r=0) but has high quadratic coefficients, $\gamma$ and R. For reference purposes nominal values for PLZT are n=2.45 and R=$2.53\times10^{-16}$ $m/V^2$ at 0.88 $\mu$m and n=2.3 and R=$2.4\times10^{-16}$ $m/V^2$ at 1.55 $\mu$m. PLZT has a polycrystalline structure with crystal sizes ranging from about 5 to 20 microns. The required electric fields are considerably higher than for liquid crystal-based devices, but the response time is much shorter.

Figure 2:
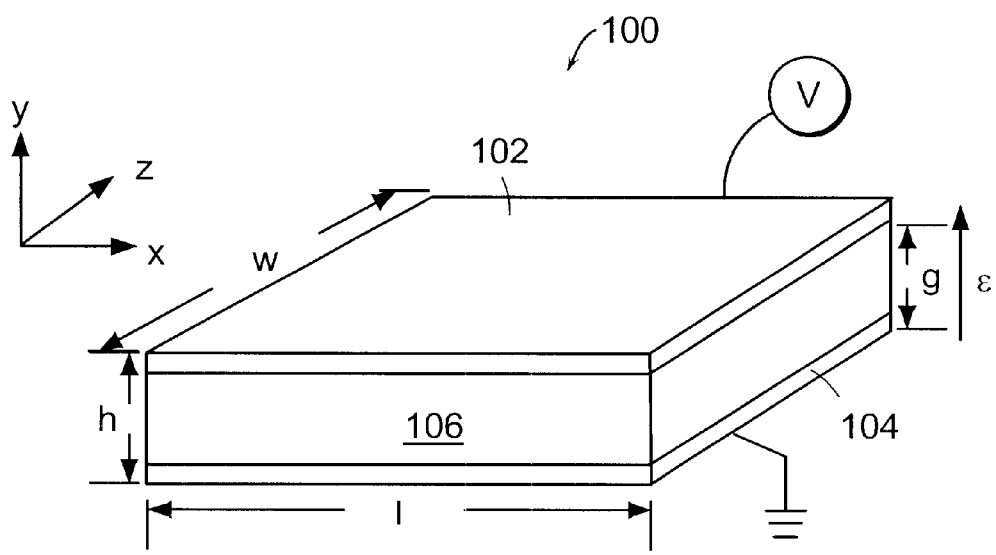
FIG. 2 is a perspective view illustrating an embodiment of a plate for use in the polarization transformer embodiment of FIG. 1.

An electrode geometry which takes advantage of this material is illustrated by the transverse field configuration illustrated in FIG. 2. A plate 100 is shown which has thin metalized electrodes 102, 104 on the top and bottom surfaces, respectively, of a block section 106 of PLZT material. The top electrode 102 is shown connected to a control voltage V and the bottom electrode is connected to ground. The electric field (designated $\epsilon$) is 90° to the direction of radiation propagation (z-axis). Since the effect is based on the electric field in the material, it is desirable to arrange the electrodes as close together as possible to minimize the control voltage. The electrode gap g can be as small as the beam diameter. For a single-mode fiber, the beam diameter is larger, typically 100 $\mu$m or more, than the fiber core diameter, typically 10 $\mu$m, because of beam divergence. In an embodiment, the height h which includes the gap, g, and the thickness of the electrodes, is about 500 $\mu$m; the length l is about 2.5 mm; the width w is about 1.5 mm. This embodiment provides an insertion loss of about 0.2 dB. It will be understood that the particular geometry described is an example and that other device geometries can be used.

Having described the operation of the single plate embodiment in FIG. 1 and the preferred materials for fabricating such a plate, additional polarization transformer embodiments in accordance with the present approach are now described.

Figure 3:
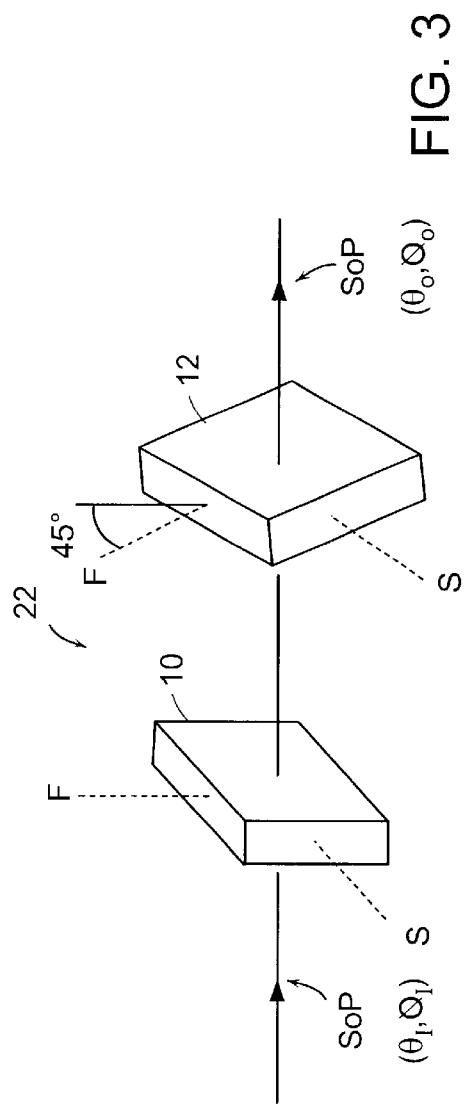
FIG. 3 is a schematic diagram illustrating an embodiment of a polarization transformer having two plates wherein the orientation of an optical axis of the second plate is 45 degrees with respect to an optical axis of the first plate.

An embodiment of a two plate polarization transformer 22 is illustrated in FIG. 3, which show a perspective view of two optical elements 10, 12 with a spacing which can be zero in some cases. A radiation beam travels from left to right in the figure and first passes through plate 10 followed by plate 12. The orientation of the optical axes of the plates 10, 12 is 45 degrees with respect to each other. With the two plate polarization transformer 22, a constant input SoP can be transformed to an arbitrary output SoP.

Figure 4:
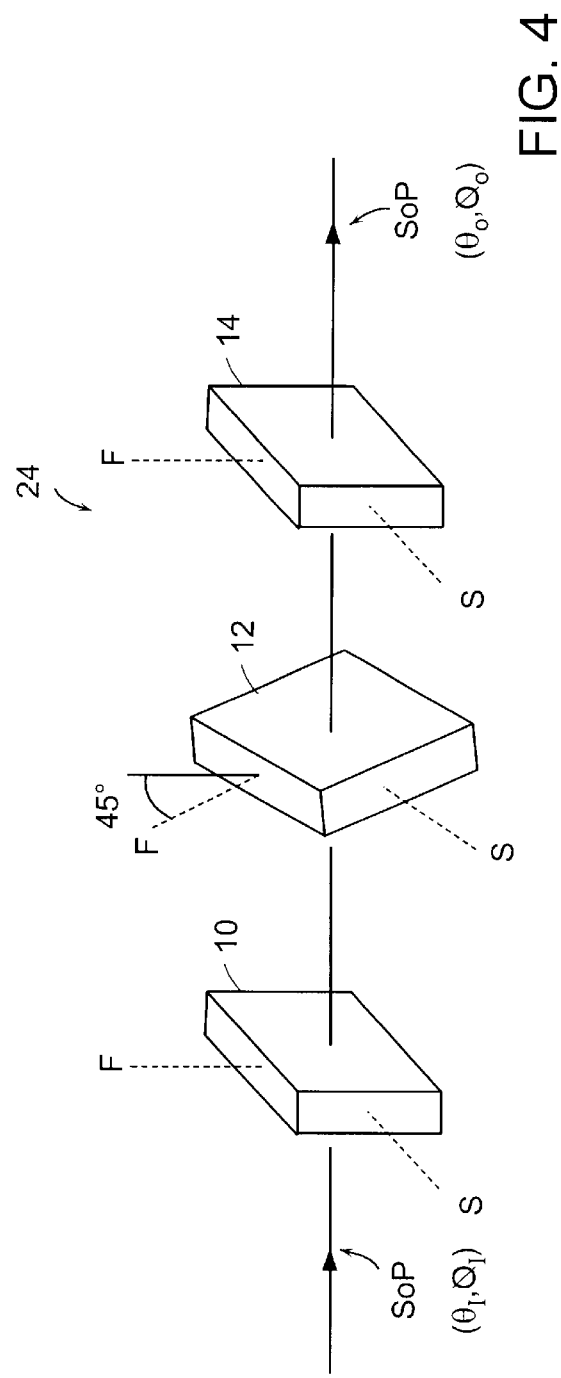
FIG. 4 is a schematic diagram illustrating an embodiment of a polarization transformer having three plates wherein the orientation of an optical axis of the second plate is 45 degrees with respect to an optical axis of the first and third plates.

An embodiment of a three plate polarization transformer 24 is illustrated in FIG. 4, which show a perspective view of three optical elements 10, 12, 14 with a spacing which again can be zero in some cases. A radiation beam travels from left to right in the figure and passes through consecutive plates 10, 12 and 14. The orientation of the optical axis of the second plate 12 is at 45 degrees with respect to the optical axis of the first and third plates 10 and 14, respectively. The second plate 12, being oriented at 45 degrees, changes the ellipticity but not the azimuth of the incident radiation. The three plate polarization transformer 24 is the most general device of the three types described in that an arbitrary input SoP can be transformed to an arbitrary output SoP.

A primary limitation on a particular wavelength arises because of the need for material transparency. In addition, since the plates are a fixed thickness, the phase delay will change with the wavelength and, as a secondary effect, the index of refraction changes with wavelength. Thus, performance of the polarization transformer can gradually degrade as wavelengths different from the nominal wavelength are used.

Figure 5:
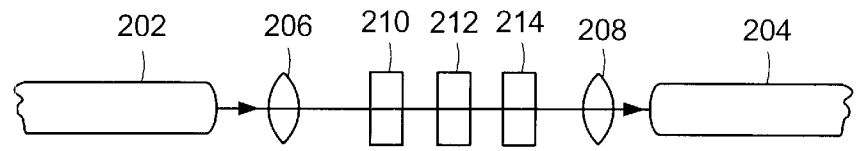
FIG. 5 is a schematic diagram illustrating a polarization transformer disposed between a pair of GRIN lenses and input and output optical fibers.

For use with fiber optic communications applications, it is usually desirable to make polarization transformers as small as possible. A configuration which adds several components is illustrated in FIG. 5. Input radiation is provided by optical fiber 202 and output through optical elements 206, 210, 212, 214, 208 to fiber 204. Following fiber 202 is a GRaded INdex (GRIN) lens 206 which functions as a collimator in front of a three plate polarization transformer comprising plates 210, 212, 214. A second GRIN lens 208 is used to collimate radiation output from the third plate 214 in front of output fiber 204.

A control approach for the foregoing polarization transformer embodiments uses precise setting of the applied control voltage(s) to achieve a desired output SoP. In such an approach, the control voltages are set in response to a correction signal generated by a sensing device coupled to the output of the transformer. The sensing device monitors one or more parameters of the output radiation (e.g., polarization state, signal spectrum) and feeds back an error signal to the control logic which adjusts the control voltages. The nature of the monitored parameters depends on the application.

As noted in the background, typical optical fibers do not preserve the state of polarization which can contribute to the degradation of optical communication signals. This problem becomes even more significant as transmission rates increase. To counter this polarization mode dispersion, a polarization transformer can be used to actively adjust the polarization state of the incoming light signal and thereby correct for the mode dispersion.

Figure 6:
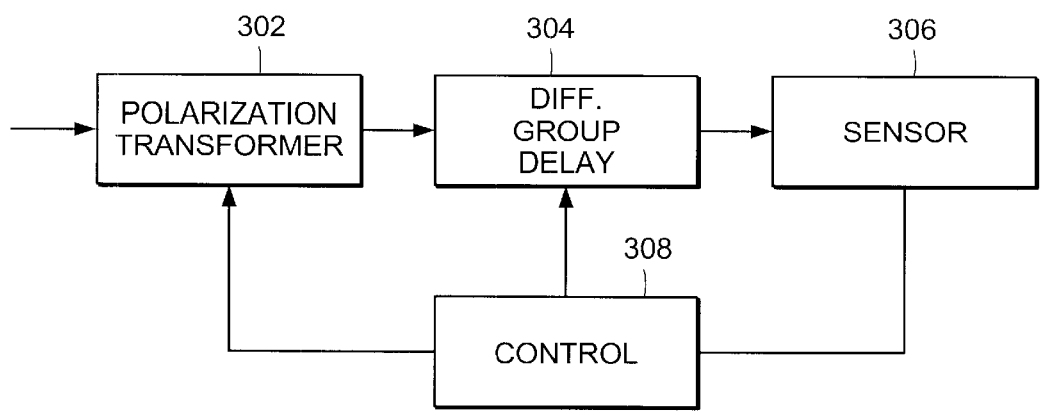
FIG. 6 is a schematic block diagram of a polarization mode dispersion control circuit.

Referring now to FIG. 6, a control circuit for use in controlling polarization mode dispersion is shown. The circuit includes a polarization transformer 302, a differential group delay (DGD) 304, a sensor 306 in a transmission path from left to right in the figure, and a control logic block 308 in a feedback path from the sensor 306 to the polarization transformer 302 and group delay 304. The polarization transformer rotates the SoP of the incoming light signal to match the axes of the DGD. The light propagates through the DGD such that the path length for one polarization component is different and adjustable with respect to the other polarization component. When this difference is equal in magnitude and opposite in sign of that in the network, the polarization mode dispersion is fully compensated.

The control approach applies in a similar manner to a coherent detection system in which a locally generated laser light beam is added to the signal-carrying beam and detected by a square law detector that generates a beat signal. The strength of the beat signal depends on the polarization state of the two beams. The polarization state can vary between 0 and a maximum value depending on whether the two beams are orthogonally polarized or parallel to each other. In such an application, the monitored parameter can be the signal level at the modulation frequency relative to the optical power. Initially the polarization state is set to maximize this ratio and the control logic tracks changes in the polarization state so that the output polarization is kept constant.

While this invention has been particularly shown and described with references to preferred embodiments thereof, it will be understood by those skilled in the art that various changes in form and details may be made therein without departing from the scope of the invention encompassed by the appended claims.

What is claimed is:

1. A polarization transformer comprising:
    a plate comprising transparent polycrystalline material having an optical axis oriented perpendicular to a propagation direction of radiation at a wavelength between 1200 nm and 1600 nm incident upon the plate that has a first polarization state, the plate having electrodes for applying an electric field across a plane of the plate perpendicular to the propagation direction to provide controlled phase change such that the polarization of radiation transmitted through the polarization transformer is transformed from the first polarization state to a second polarization state.

2. The polarization transformer of claim 1 wherein the plate comprises lead lanthanum zirconate titanate (PLZT) material.

3. The polarization transformer of claim 1 wherein the plate comprises transparent ceramic material.

4. The polarization transformer of claim 1 wherein the plate comprises a ferroelectric complex oxide.

5. The polarization transformer of claim 1 wherein the plate is isotropic in the absence of an applied electric field across the plate electrodes.

6. The polarization transformer of claim 1 wherein an electric field corresponding to an applied voltage less than 400 volts provides a phase retardation of about 180 degrees.

7. The polarization transformer of claim 1 further comprising a pair of GRIN lenses disposed in a propagation path of the radiation such that the plate is disposed between the pair.

8. A polarization transformer comprising:
    at least one plate comprising transparent polycrystalline material having an optical axis oriented perpendicular to a propagation direction of radiation incident upon the polarization transformer that has a first arbitrary polarization state, the at least one plate having electrodes for applying an electric field across a plane of the plate perpendicular to the propagation direction to provide phase change such that the polarization of radiation transmitted through the polarization transformer is transformed from the first arbitrary polarization state to a second arbitrary polarization state.

9. The polarization transformer of claim 8 wherein the at least one plate comprises first and second plates disposed such that the incident radiation is transmitted through the two plates and wherein the orientation of an optical axis of the second plate is at 45 degrees with respect to the optical axis of the first plate.

10. The polarization transformer of claim 8 wherein the at least one plate comprises first, second and third plates disposed such that the incident radiation is transmitted through the three plates and wherein the orientation of an optical axis of the second plate is at 45 degrees with respect to the optical axis of the first and third plates.

11. The polarization transformer of claim 8 wherein the at least one plate comprises lead lanthanum zirconate titanate (PLZT) material.

12. The polarization transformer of claim 8 wherein the at least one plate comprises transparent ceramic material.

13. The polarization transformer of claim 8 wherein the at least one plate comprises a ferroelectric complex oxide.

14. The polarization transformer of claim 8 wherein the radiation is transmitted along a single propagation path through the at least one plate.

15. A polarization transformer comprising:
  at least one plate comprising lead lanthanum zirconate titanate (PLZT) material having an optical axis oriented perpendicular to a propagation direction of radiation incident upon the polarization transformer that has a first arbitrary polarization state, the at least one plate having electrodes for applying an electric field across a plane of the plate perpendicular to the propagation direction to provide phase change such that the polarization of radiation transmitted through the polarization transformer is transformed from the first arbitrary polarization state to a second polarization state.

16. The polarization transformer of claim 15 wherein the second polarization state is a second arbitrary polarization state.

17. The polarization transformer of claim 15 wherein the at least one plate comprises first, second arid third plates disposed such that the incident radiation is transmitted through the three plates and wherein the orientation of an optical axis of the second plate is at 45 degrees with respect to the optical axis of the first and third plates.

18. A polarization transformer comprising:
  a plate comprising ferroelectric complex oxide having an optical axis oriented perpendicular to a propagation direction of radiation incident upon the plate that has a first polarization state, the plate having electrodes for applying an electric field across a plane of the plate perpendicular to the propagation direction to provide controlled phase change such that the polarization of radiation transmitted through the polarization transformer is transformed from the first polarization state to a second polarization state.

19. A polarization transformer comprising:
  a plate comprising transparent polycrystalline material having an optical axis oriented perpendicular to a propagation direction of radiation incident upon the plate that has a first polarization state, the plate having electrodes for applying an electric field across a plane of the plate perpendicular to the propagation direction to provide controlled phase change such that the polarization of radiation transmitted through the polarization transformer is transformed from the first polarization state to a second polarization state wherein an electric field corresponding to an applied voltage less than 400 volts provides a phase retardation of about 180 degrees.

20. A polarization transformer comprising:
  a plate comprising transparent polycrystalline material having an optical axis oriented perpendicular to a propagation direction of radiation incident upon the plate that has a first polarization state, the plate having electrodes for applying an electric field across a plane of the plate perpendicular to the propagation direction to provide controlled phase change such that the polarization of radiation transmitted through the polarization transformer is transformed from the first polarization state to a second polarization state; and a pair of GRIN lenses disposed in a propagation path of the radiation such that the plate is disposed between the pair.

21. A polarization transformer comprising:
  first and second plates comprising transparent polycrystalline material having an optical axis oriented perpendicular to a propagation direction of radiation incident upon the polarization transformer that has a first polarization state, the first and second plates having electrodes for applying an electric field across a plane of the plates perpendicular to the propagation direction to provide phase change such that the polarization of radiation transmitted through the polarization transformer is transformed from the first polarization state to a second polarization state wherein the first and second plates are disposed such that the incident radiation is transmitted through the two plates and wherein the orientation of an optical axis of the second plate is at 45 degrees with respect to the optical axis of the first plate.

22. A polarization transformer comprising:
  first, second and third plates comprising transparent polycrystalline material having an optical axis oriented perpendicular to a propagation direction of radiation incident upon the polarization transformer that has a first polarization state, the first, second and third plates having electrodes for applying an electric field across a plane of the plates perpendicular to the propagation direction to provide phase change such that the polarization of radiation transmitted through the polarization transformer is transformed from the first polarization state to a second polarization state wherein the first, second and third plates are disposed such that the incident radiation is transmitted through the three plates and wherein the orientation of an optical axis of the second plate is at 45 degrees with respect to the optical axis of the first and third plates.

* * * * *